(12) United States Patent
Hu et al.

(10) Patent No.: US 11,502,366 B2
(45) Date of Patent: Nov. 15, 2022

(54) ECHELON UTILIZATION BATTERY PACK WITH GOOD SEISMIC RESISTANCE

(71) Applicant: Anhui Lvwo Recycling Energy Technology Co., Ltd., Lu'an (CN)

(72) Inventors: Tianwen Hu, Lu'an (CN); Pai Li, Lu'an (CN); Yunsheng Li, Lu'an (CN); Qiong Li, Lu'an (CN)

(73) Assignee: Anhui Lvwo Recycling Energy Technology Co , Ltd., Lu'an (CN)

( * ) Notice: Subject to any disclaimer, the term of this patent is extended or adjusted under 35 U.S.C. 154(b) by 89 days.

(21) Appl. No.: 17/237,969

(22) Filed: Apr. 22, 2021

(65) Prior Publication Data
US 2021/0344075 A1 Nov. 4, 2021

(30) Foreign Application Priority Data

Apr. 30, 2020 (CN) .......................... 202010361558.8

(51) Int. Cl.
*H01M 50/242* (2021.01)
*H01M 10/613* (2014.01)
*H01M 10/625* (2014.01)
*H01M 10/6563* (2014.01)
*H01M 50/249* (2021.01)
*H01M 50/30* (2021.01)
*H01M 50/244* (2021.01)
*H01M 50/204* (2021.01)
*H01M 50/271* (2021.01)

(52) U.S. Cl.
CPC ....... *H01M 50/242* (2021.01); *H01M 10/613* (2015.04); *H01M 10/625* (2015.04); *H01M 10/6563* (2015.04); *H01M 50/204* (2021.01); *H01M 50/244* (2021.01); *H01M 50/249* (2021.01); *H01M 50/271* (2021.01); *H01M 50/30* (2021.01); *H01M 2220/20* (2013.01)

(58) Field of Classification Search
CPC ............ H01M 50/242; H01M 10/613; H01M 10/625; H01M 10/6563; H01M 50/204; H01M 50/244; H01M 50/249; H01M 50/271; H01M 50/30; H01M 2220/20; H01M 50/209; H01M 50/20
See application file for complete search history.

(56) References Cited

FOREIGN PATENT DOCUMENTS

CN     110364658 A  * 10/2019

\* cited by examiner

*Primary Examiner* — Matthew T Martin
*Assistant Examiner* — Bartholomew A Hornsby
(74) *Attorney, Agent, or Firm* — Procopio, Cory, Hargreaves & Savitch, LLP

(57) ABSTRACT

Disclosed is an echelon utilization battery pack with good seismic resistance. The echelon utilization battery pack involves a battery pack body and a battery, wherein the battery pack body is of a hollow cuboid structure, fixed seats are fixed at two ends of the inner bottom of the battery pack body, first fixed shafts are fixed between the two fixed seats, the first fixed shafts are slidably connected with a mounting seat in a sleeving mode, a first sliding groove is formed in the top of the mounting seat, second fixed shafts are fixed in the first sliding groove, and the two ends of the second fixed shafts are slidably connected with first sliding blocks.

9 Claims, 4 Drawing Sheets

ECHELON UTILIZATION BATTERY PACK WITH GOOD SEISMIC RESISTANCE

CROSS-REFERENCE TO RELATED APPLICATIONS

This application claims priority to Chinese Patent Application No. 202010361558.8, filed Apr. 30, 2020, the contents of which are incorporated herein by reference in its entirety for all purposes.

BACKGROUND

Technical Field

The present disclosure relates to the technical field of battery packs, in particular to an echelon utilization battery pack with good seismic resistance.

Related Art

Components that can accommodate one or more batteries are referred to as battery packs. Along with the development of new energy automobiles, pure electric automobiles are mostly applied at present, a single storage battery is adopted as an energy storage power source of the automobile, the storage battery is used as the energy storage power source, electric energy is provided for a motor through the battery, the motor is driven to operate, and therefore the automobile is pushed to run.

Although the pure electric automobile can effectively save petroleum consumption, due to the lack of an anti-seismic device, when the pure electric automobile is collided, the batteries in the battery pack is prone to liquid leakage, the use safety is low, defects exist in use, and therefore an echelon utilization battery pack with good seismic resistance is provided.

SUMMARY

In order to solve the problem that a battery in a battery pack is easy to damage after collision due to lack of an anti-seismic device in the prior art, the present disclosure provides an echelon utilization battery pack with good seismic resistance.

In order to achieve the above purpose, the present disclosure adopts the following technical scheme:

An echelon utilization battery pack with good seismic resistance comprises a battery pack body and a battery, the battery pack body is of a hollow cuboid structure, fixed seats are fixed at two ends of the inner bottom of the battery pack body, first fixed shafts are fixed between the two fixed seats, the first fixed shafts are slidably connected with a mounting seat in a sleeving mode, a first sliding groove is formed in the top of the mounting seat, second fixed shafts are fixed in the first sliding groove, the two ends of the second fixed shafts are slidably connected with first sliding blocks, the tops of the first sliding blocks are slidably connected with a first shell in a sliding mode, a buffer plate is fixed to the top of the first shell, threaded rods are rotatably connected to the inner walls of the battery pack body through bearings respectively, the threaded rods are inserted into the battery pack body and connected with a second shell, a fourth fixed shaft is fixed into the second shell, second sliding blocks are slidably connected to the two ends of the fourth fixed shaft, connecting rods are rotatably connected to the side faces of the two second sliding blocks respectively, a clamping block is rotatably connected to one end of each of the connecting rods, a third fixed shaft is fixed to the side face of the battery, the third fixed shaft is slidably connected with the clamping block, and a seal cover is mounted on the top of the battery pack body.

Preferably, first springs are mounted between the mounting seat and the fixed seats, and the first springs are connected to the first fixed shafts in the sleeving mode.

Preferably, fourth springs are mounted between the first sliding blocks and the sliding groove, and the fourth springs are connected to the second fixed shafts in the sleeving mode.

Preferably, the number of the first fixed shafts and the number of the second fixed shafts are both two groups, and the two groups of first fixed shafts and the two groups of second fixed shafts are both parallel to the inner bottom of the battery pack body.

Preferably, the longitudinal sections of the first sliding blocks are of n-shaped structures, the first shell is of a hollow cuboid structure, and second springs are mounted between the interior of the first shell and the first sliding blocks.

Preferably, rubber mats are mounted between the inner bottoms of the first sliding blocks and the inner top of the first shell.

Preferably, third springs are mounted between the side faces of the second sliding blocks and the inner wall of the second shell, and the third springs are connected to the fourth fixed shafts in the sleeving mode.

Preferably, the seal cover is in sliding connection with the battery, and a cushion is arranged between the seal cover and the battery.

Preferably, a draught fan and ventilation holes are arranged in the two ends of the top of the seal cover respectively, and dustproof cotton is arranged in an air inlet of the draught fan and the ventilation holes respectively.

Compared with the prior art, the present disclosure has the following beneficial effects:

firstly, when the echelon utilization battery pack is mounted, firstly, the battery is placed on the top of the buffer plate in the battery pack body, pressure is continuously applied downwards after the battery makes contact with the buffer plate, at the moment, the buffer plate drives the first shell, the first shell and the first sliding blocks slide relatively, at the moment, the rubber mats and the second springs generate elastic force due to second deformation, the clamping block is extruded in the downward movement process of the battery, the clamping block drives the connecting rods, the connecting rods drive the second sliding blocks, the second sliding blocks compress the third springs, when the battery drives the third fixed shaft to move to the horizontal position of the clamping block, the clamping block is connected with the third fixed shaft in a clamping mode under the action of the third springs, the second shell is driven by adjusting the threaded rods, the deformation degree of the third springs is further increased, the seal cover is closed to connect the draught fan with the battery, and thus, installation is completed; a multi-directional suspension effect is provided for the battery in the battery pack body through the multiple groups of first springs, second springs, rubber mats, third springs and fourth springs in the device, and the internal battery can be well protected during collision, so that the use safety is improved; and secondly, in the using process of the battery, the draught fan injects air into the device, hot air in the device is exhausted through the ventilation holes, the heat dissipation effect of the battery is improved by increasing air flow, and the service life of the battery is prolonged.

DETAILED DESCRIPTION

The following clearly and completely describes the technical scheme in the embodiments of the present disclosure with reference to the attached figures in the embodiments of the present disclosure. Apparently, the described embodiments are merely a part rather than all of the embodiments of the present disclosure.

Figure 1:
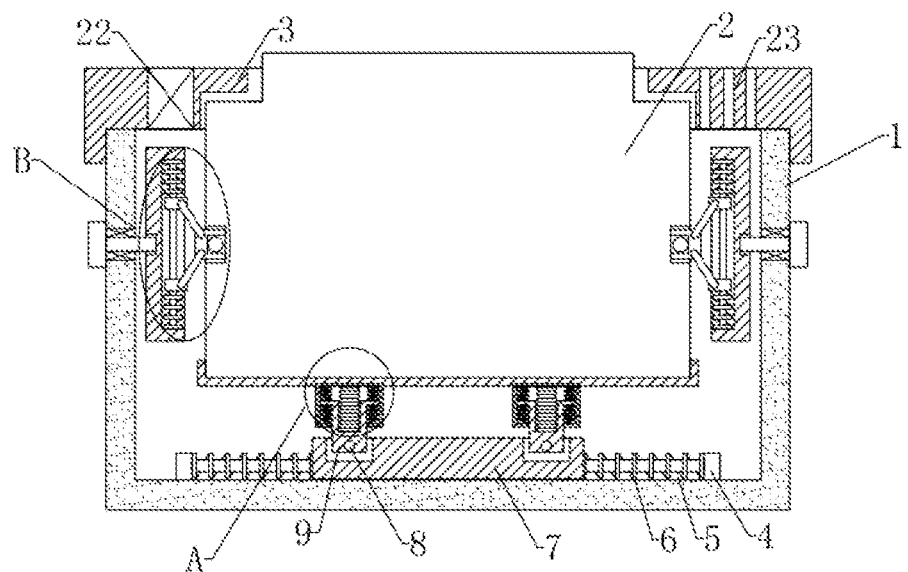
FIG. 1 is a structural schematic diagram of an echelon utilization battery pack with good seismic resistance provided by the present disclosure.
Figure 2:
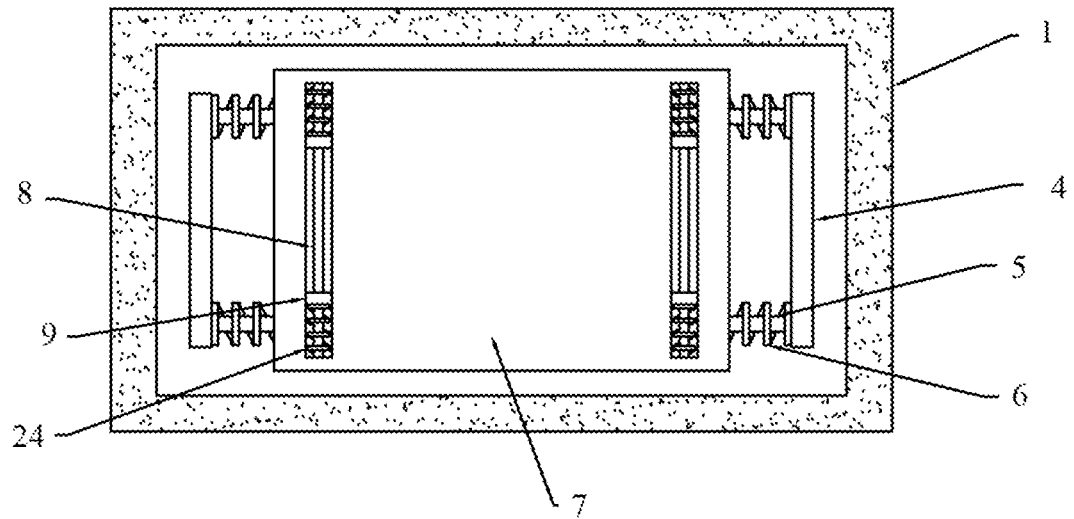
FIG. 2 is a mounting schematic diagram of a mounting plate of the echelon utilization battery pack with good seismic resistance provided by the present disclosure.
Figure 3:
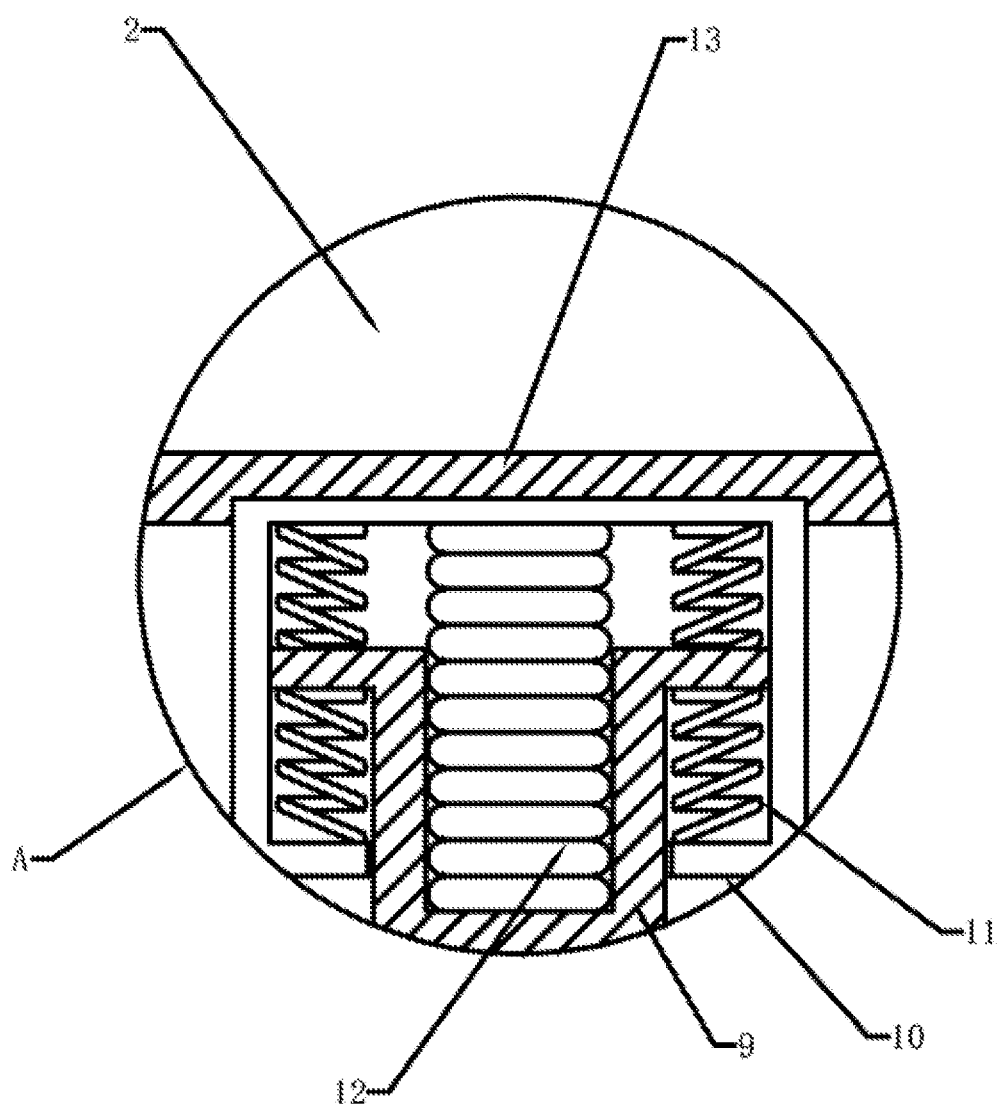
FIG. 3 is an amplified schematic diagram of Part A of the echelon utilization battery pack with good seismic resistance provided by the present disclosure.
Figure 4:
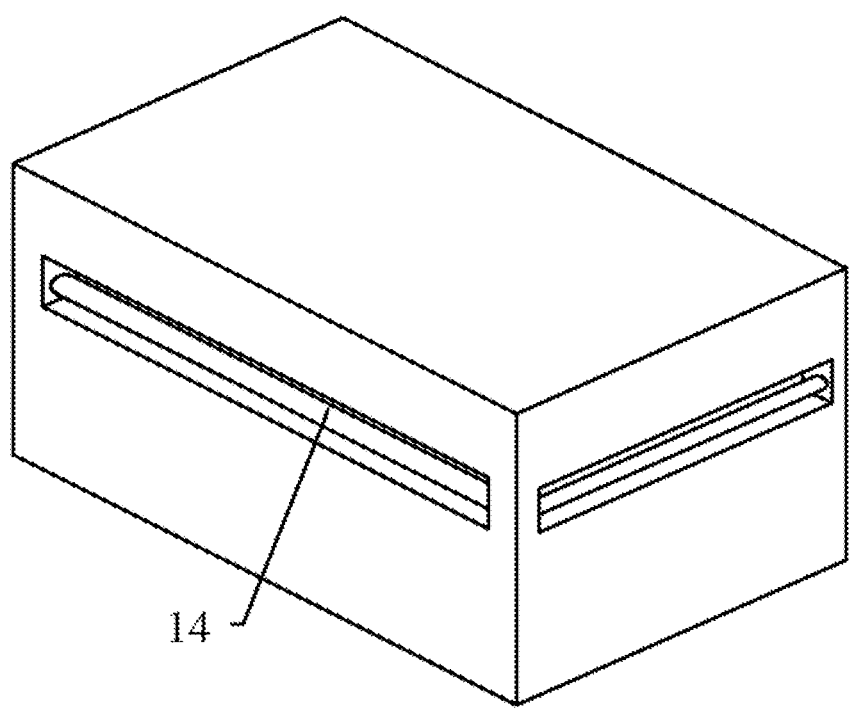
FIG. 4 is an overall diagram of the echelon utilization battery pack with good seismic resistance provided by the present disclosure.
Figure 5:
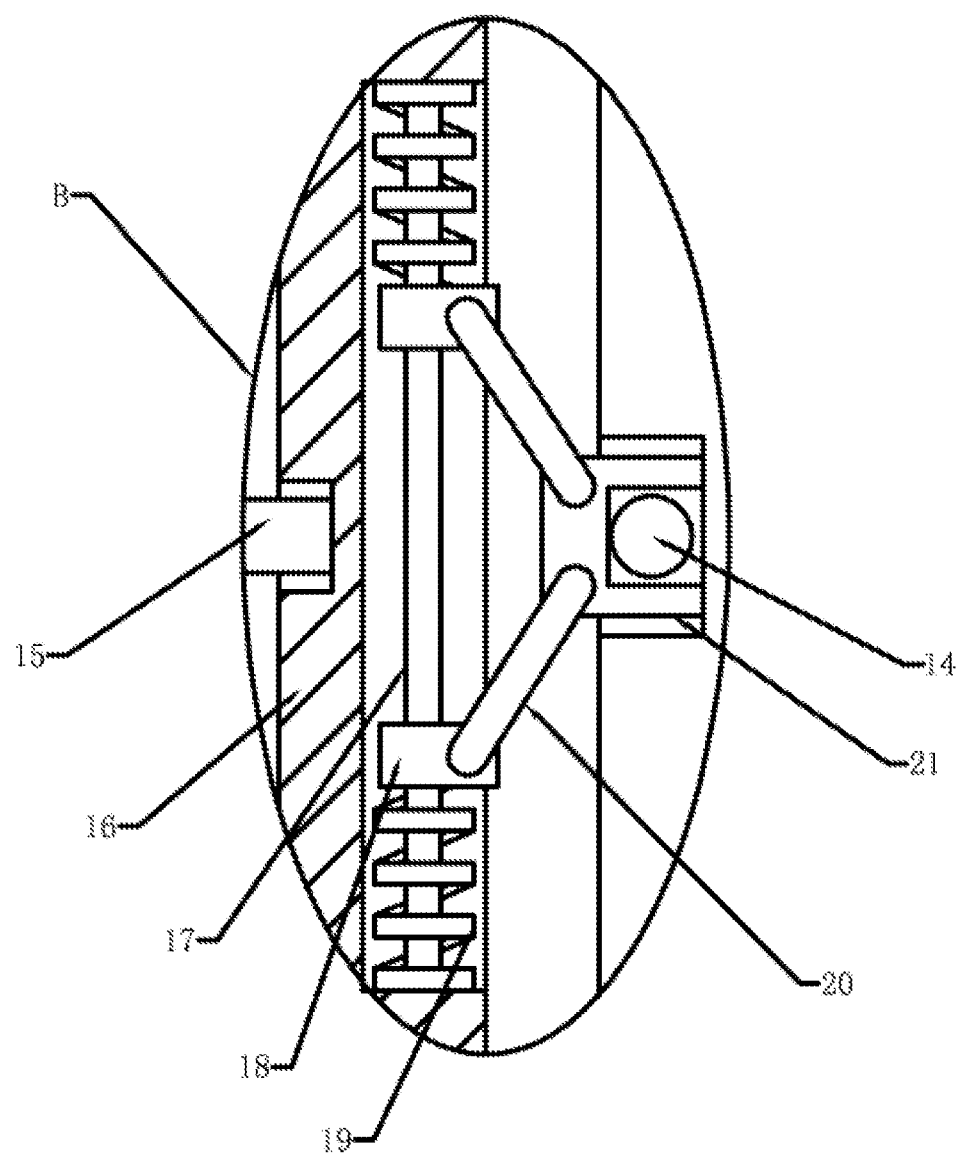
FIG. 5 is an amplified schematic diagram of Part B of the echelon utilization battery pack with good seismic resistance provided by the present disclosure.

Referring to FIG. 1 to FIG. 5, an echelon utilization battery pack with good seismic resistance comprises a battery pack body 1 and a battery 2, the battery pack body 1 is of a hollow cuboid structure, fixed seats 4 are fixed at two ends of the inner bottom of the battery pack body 1, first fixed shafts 5 are fixed between the two fixed seats 4, first springs 6 are mounted between a mounting seat 7 and the fixed seats 4, the first springs 6 are connected to the first fixed shafts 5 in a sleeving mode, the first fixed shafts 5 are slidably connected with the mounting seat 7 in the sleeving mode, a first sliding groove is formed in the top of the mounting seat 7, second fixed shafts 8 are fixed in the first sliding groove, fourth springs 24 are mounted between the first sliding blocks 9 and the sliding groove, the fourth springs 24 are connected to the second fixed shafts 8 in the sleeving mode, the number of the first fixed shafts 5 and the number of the second fixed shafts 8 are both two groups, the two groups of first fixed shafts 5 and the two groups of second fixed shafts 8 are both parallel to the inner bottom of the battery pack body 1, the two ends of the second fixed shafts 8 are slidably connected with first sliding blocks 9, the tops of the first sliding blocks 9 are slidably connected with a first shell 10 in a sliding mode, a buffer plate 13 is fixed to the top of the first shell 10, threaded rods 15 are rotatably connected to the inner walls of the battery pack body 1 through bearings respectively, the threaded rods 15 are inserted into the battery pack body 1 and connected with a second shell 16, a fourth fixed shaft 17 is fixed into the second shell 16, second sliding blocks 18 are slidably connected to the two ends of the fourth fixed shaft 17, third springs 19 are mounted between the side faces of the second sliding blocks 18 and the inner wall of the second shell 16, the third springs 19 are connected to the fourth fixed shafts 17 in the sleeving mode, connecting rods 20 are rotatably connected to the side faces of the two second sliding blocks 18 respectively, a clamping block 21 is rotatably connected to one end of each of the connecting rods 20, a third fixed shaft 14 is fixed to the side face of the battery 2, the third fixed shaft 14 is slidably connected with the clamping block 2, a multi-directional suspension effect is provided for the battery 2 in the battery pack body 1, and the internal battery can be well protected during collision, so that the use safety is improved.

A seal cover 3 is mounted on the top of the battery pack body 1, the seal cover 3 is in sliding connection with the battery 2, a cushion is arranged between the seal cover 3 and the battery 2, a draught fan 22 and ventilation holes 23 are arranged in the two ends of the top of the seal cover 3 respectively, dustproof cotton is arranged in an air inlet of the draught fan 22 and the ventilation holes 23 respectively, the heat dissipation effect of the battery is improved by increasing air flow, and the service life of the battery is prolonged.

The working principle is as follows: when the echelon utilization battery pack is mounted, firstly, the battery 2 is placed on the top of the buffer plate 13 in the battery pack body 1, pressure is continuously applied downwards after the battery makes contact with the buffer plate 13, at the moment, the buffer plate 13 drives the first shell 10, the first shell 10 and the first sliding blocks 9 slide relatively, at the moment, the rubber mats 12 and the second springs 11 generate elastic force due to second deformation, the clamping block 21 is extruded in the downward movement process of the battery 2, the clamping block 21 drives the connecting rods 20, the connecting rods 20 drive the second sliding blocks 18, the second sliding blocks 18 compress the third springs 19, when the battery 2 drives the third fixed shaft 14 to move to the horizontal position of the clamping block 21, the clamping block 21 is connected with the third fixed shaft 14 in a clamping mode under the action of the third springs 19, the second shell 16 is driven by adjusting the threaded rods 15, the deformation degree of the third springs 19 is further increased, the seal cover 3 is closed to connect the draught fan 22 with the battery 2, and thus, installation is completed; a multi-directional suspension effect is provided for the battery 2 in the battery pack body 1 through the multiple groups of first springs 6, second springs 11, rubber mats 12, third springs 19 and fourth springs 24 in the device, and the internal battery 2 can be well protected during collision, so that the use safety is improved.

In the using process of the battery, the draught fan 22 injects air into the device, hot air in the device is exhausted through the ventilation holes 23, the heat dissipation effect of the battery is improved by increasing air flow, and the service life of the battery is prolonged.

The above mentioned are only preferred specific embodiments of the present disclosure. However, the scope of protection of the present disclosure is not limited to the embodiments described herein. Any technicians skilled in the technical field are within the technical scope disclosed by the present disclosure; and any replacements or modifications according to the technical schemes of the present disclosure and ideas thereof all shall be included in the scope of protection of the present disclosure.

REFERENCE SIGNS 1, battery pack body; 2, battery; 3, seal cover; 4, fixed seat; 5, first fixed shaft; 6, first spring; 7, mounting seat; 8, second fixed shaft; 9, first sliding block; 10, first shell; 11, second spring; 12, rubber mat; 13, buffer plate; 14, third fixed shaft; 15, threaded rod; 16, second shell; 17, fourth fixed shaft; 18, second sliding block; 19, third spring; 20, connecting rod; 21, clamping block; 22, draught fan; 23, ventilation hole; and 24, fourth spring.

What is claimed is:

1. An echelon utilization battery pack with good seismic resistance, comprising:

a battery pack body and a battery, wherein the battery pack body is of a hollow cuboid structure, fixed seats are fixed at two ends of the inner bottom of the battery pack body, first fixed shafts are fixed between the two fixed seats, the first fixed shafts are slidably connected with a mounting seat in a sleeving mode, a first sliding groove is formed in the top of the mounting seat, second fixed shafts are fixed in the first sliding groove, the two ends of the second fixed shafts are slidably connected with first sliding blocks, the tops of the first sliding blocks are slidably connected with a first shell in a sliding mode, a buffer plate is fixed to the top of the first shell, threaded rods are rotatably connected to the inner walls of the battery pack body through bearings respectively, the threaded rods are inserted into the battery pack body and connected with a second shell, a fourth fixed shaft is fixed into the second shell, second sliding blocks are slidably connected to the two ends of the fourth fixed shaft, connecting rods are rotatably connected to the side faces of the two second sliding blocks respectively, a clamping block is rotatably connected to one end of each of the connecting rods, a third fixed shaft is fixed to the side face of the battery, the third fixed shaft is slidably connected with the clamping block, and a seal cover is mounted on the top of the battery pack body.

2. The echelon utilization battery pack with good seismic resistance according to claim 1, wherein first springs are mounted between the mounting seat and the fixed seats, and the first springs are connected to the first fixed shafts in the sleeving mode.

3. The echelon utilization battery pack with good seismic resistance according to claim 1, wherein fourth springs are mounted between the first sliding blocks and the sliding groove, and the fourth springs are connected to the second fixed shafts in the sleeving mode.

4. The echelon utilization battery pack with good seismic resistance according to claim 1, wherein the number of the first fixed shafts and the number of the second fixed shafts are both two groups, and the two groups of first fixed shafts and the two groups of second fixed shafts are both parallel to the inner bottom of the battery pack body.

5. The echelon utilization battery pack with good seismic resistance according to claim 1, wherein the longitudinal sections of the first sliding blocks are of n-shaped structures, the first shell is of a hollow cuboid structure, and second springs are mounted between the interior of the first shell and the first sliding blocks.

6. The echelon utilization battery pack with good seismic resistance according to claim 5, wherein rubber mats are mounted between the inner bottoms of the first sliding blocks and the inner top of the first shell.

7. The echelon utilization battery pack with good seismic resistance according to claim 1, wherein third springs are mounted between the side faces of the second sliding blocks and the inner wall of the second shell, and the third springs are connected to the fourth fixed shafts in the sleeving mode.

8. The echelon utilization battery pack with good seismic resistance according to claim 1, wherein the seal cover is in sliding connection with the battery, and a cushion is arranged between the seal cover and the battery.

9. The echelon utilization battery pack with good seismic resistance according to claim 8, wherein a draught fan and ventilation holes are arranged in the two ends of the top of the seal cover respectively, and dustproof cotton is arranged in an air inlet of the draught fan and the ventilation holes respectively.

* * * * *